No. 778,306. Patented December 27, 1904.

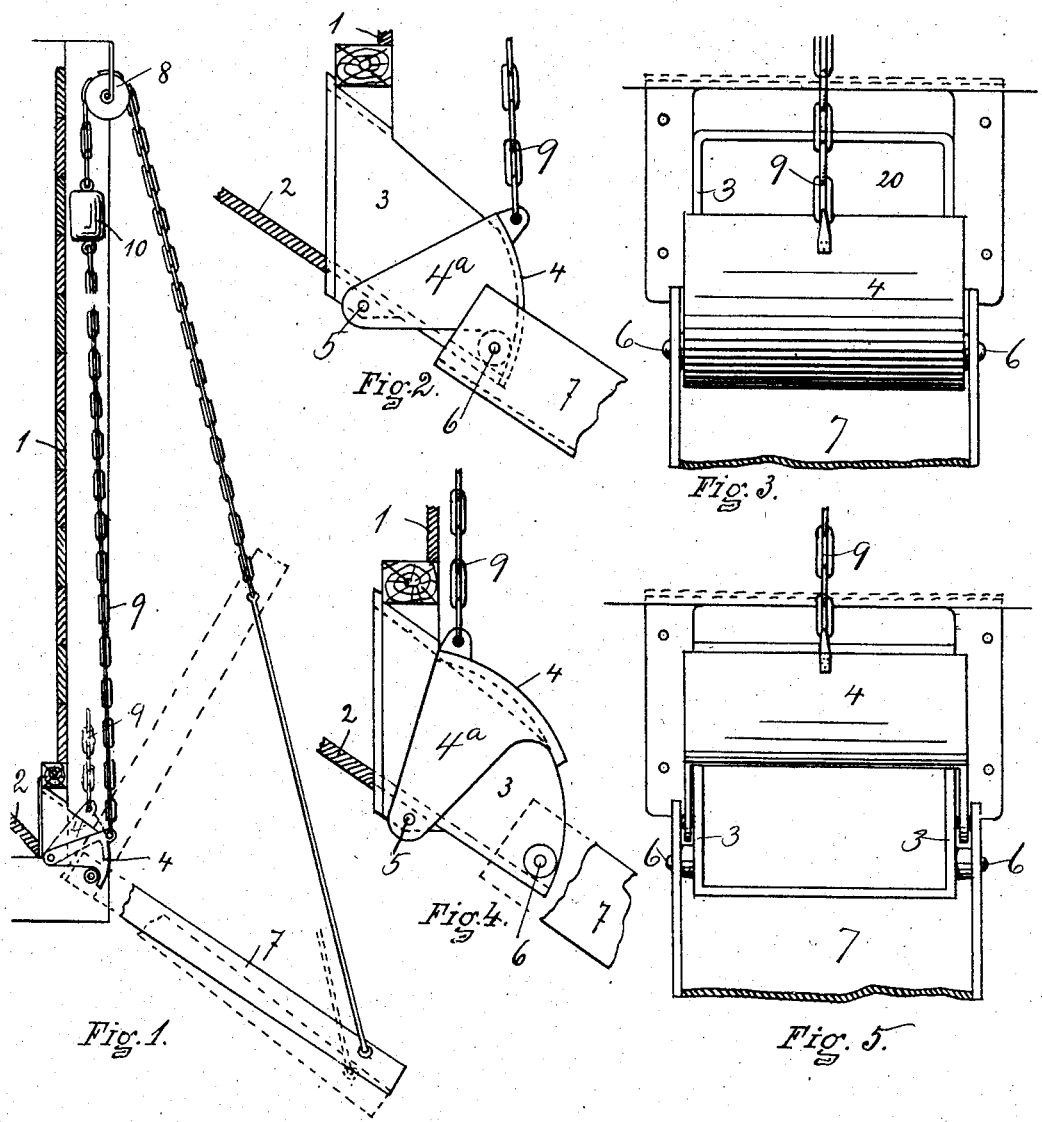

UNITED STATES PATENT OFFICE.

DAVID BRADFORD COOK, OF FRANKFORT, NEW YORK, ASSIGNOR TO ACME ROAD MACHINERY COMPANY, OF FRANKFORT, NEW YORK.

BIN-CHUTE GATE AND OPERATING MECHANISM.

SPECIFICATION forming part of Letters Patent No. 778,306, dated December 27, 1904.

Application filed August 15, 1903. Serial No. 169,572.

*To all whom it may concern:*

Be it known that I, DAVID BRADFORD COOK, of Frankfort, in the county of Herkimer and State of New York, have invented certain new and useful Improvements in Bin-Chute Gates and Operating Mechanism; and I do hereby declare that the following is a full, clear, and exact description of the invention, which will enable others skilled in the art to which it appertains to make and use the same, reference being had to the accompanying drawings, and to the figures of reference marked thereon, which form part of this specification.

The object of my invention is to provide a combination chute and gate more particularly adapted for use in connection with broken-stone bins and coal-bins, which devices are adapted for convenient and easy manipulation and effectively perform the purpose for which they are intended.

In the drawings, Figure 1 shows a side elevation of my improved device in connection with a small section of a bin to which it is applied. In this figure the full line shows the chute down and the gate closed. Dotted lines show the position to which the chute may be operated. Fig. 2 shows details, on an enlarged scale, of the bin-chute and the gate controlling the same in side elevation. Fig. 3 shows a front view of the part shown in Fig. 2. Fig. 4 shows a side elevation similar to Fig. 2 with the gate in open position. Fig. 5 shows a front elevation of the same.

Referring to the reference-figures in a more particular description, 1 indicates the side of a suitable bin, and 2 the inclined bottom of the same. The bin is provided with a short bin-spout 3, which has side walls and an inclined bottom. The ends of the walls 3 are preferably circular.

The gate consists of a curved plate 4, mounted by means of arms 4ª, which pass on the outside of the walls of the spout on pivots 5.

Mounted on pivots 6, provided at the lower end of the spout 3, is the elongated chute 7. Mounted on a suitable support in an elevated position and preferably on the side of the bin 1 there is provided a roller or pulley 8. Chain 9 is connected with the gate 4 and passes over the pulley 8 and is connected with the outer end of the chute 7. In the chain 9, between the gate 4 and the pulley 8, there is provided a counterweight 10, which is sufficient to counterbalance the outer end of the chute 7.

When not in use, the chute 7 can be placed in the elevated position shown in dotted lines in Fig. 1, where it is substantially out of the way. When it is desired to discharge the contents of the bin, the operator draws down the chute from the dotted position mentioned into the position shown in full lines, and the receiving wagon or car is suitably located thereunder. Then by depressing the chute 7 from the position shown in full lines to that shown in dotted lines the gate 4 will be moved into open position, allowing the contents to flow out of the spout 3 and down to chute 7. When it is desired to stop the flow, the operator elevates the chute 7 slightly—that is to say, from the position shown in the lower dotted lines to that shown in the full lines. In so doing the gate 4 closes by gravity. In the position shown in full lines in Fig. 1 the chute 7 is still in sufficiently-inclined position to allow the contents to flow freely, and shortly after the gate 4 is closed the chute will be free from all contents, and it may then be folded into the upper dotted-line position.

As shown in the drawings, the upper part of the chute 3 is left open, as indicated at 20. This is preferable in handling such coarse material as broken stone, coal, &c. In case the device was used with finer material this space would be more or less closed.

What I claim as new, and desire to secure by Letters Patent, is—

1. The combination with a bin-spout and an automatically-closing gate, therefor, of a chute, providing an extension to the spout, pivoted at the spout end and a connection between the swinging end of the chute and the spout-gate, whereby the gate may be controlled by operating the spout, substantially as set forth.

2. The combination with the bin-spout 3, having the gate 4 of the extension-chute 7 pivotally mounted, and the connection between the gate 4 and the swinging end of the spout 7 extending over an elevated pulley, and including a counterweight between the pulley and the gate, substantially as set forth.

In witness whereof I have affixed my signature, in presence of two witnesses, this 24th day of July, 1903.

DAVID BRADFORD COOK.

Witnesses:
　WALTER A. COOK,
　M. W. SEGER.